Feb. 4, 1969 T. J. O'HALLORAN ET AL 3,426,152

TELEPHONE ANSWERING DEVICE

Filed May 20, 1964 Sheet 1 of 3

INVENTORS
Timothy J. O'Halloran
James E. O'Donnell

BY [signature]

ATTORNEY

Feb. 4, 1969 T. J. O'HALLORAN ET AL 3,426,152

TELEPHONE ANSWERING DEVICE

Filed May 20, 1964 Sheet 2 of 3

INVENTORS

Timothy J. O'Halloran
James E. O'Donnell

BY Jerome Bauer

ATTORNEY

Feb. 4, 1969 T. J. O'HALLORAN ET AL 3,426,152

TELEPHONE ANSWERING DEVICE

Filed May 20, 1964 Sheet 3 of 3

INVENTORS
Timothy J. O'Halloran
James E. O'Donnell

BY Jerome Bauer

ATTORNEY

United States Patent Office 3,426,152
Patented Feb. 4, 1969

3,426,152

TELEPHONE ANSWERING DEVICE

Timothy J. O'Halloran, 10 Walbridge Ave., Babylon, N.Y. 11702, and James E. O'Donnell, 9 N. 12th St., New Hyde Park, N.Y. 11040

Filed May 20, 1964, Ser. No. 368,799
U.S. Cl. 179—6 10 Claims
Int. Cl. H04m *11/00*

ABSTRACT OF THE DISCLOSURE

An automatic telephone answering device including a recording means having a single record medium for both prerecording a message to be played back to a calling party and for recording a message from the calling party. Control means are provided to control the operation of the recording means to reproduce the prerecorded message for the caller and to operate the recording means to record the incoming message. The control means is actuated by a first control member mounted on one side of the record medium and a second control member mounted on the other side of the record medium. The space between the first control member and the second control member define the prerecorded message space and the space between the second control member and the next adjacent control member define the incoming message space so that a single record medium is utilized to reproduce the prerecorded message and to record the incoming message.

This invention relates to telephone answering equipment, and, more particularly, to equipment which is inexpensive and simple of construction but which automatically and efficiently answers an unattended telephone to transmit to the calling party a message from the called party and to record a message from the calling party.

Automatic telephone answering devices are not new. Several different types of devices operating in different modes have been in use in the past, but most of the prior art devices have suffered from one disadvantage or another. The major disadvantage has been the complexity of the mechanism and the attendant high maintenance costs.

There are two basic types of automatic telephone answering devices: (a) those which are connected directly to the telephone lines, and (b) those which are not directly connected to the telephone lines but which operate inductively through the telephone itself.

The second type (b), requires a means which is responsive to the ringing of the telephone bell, such as a solenoid or other mechanical device, to physically lift the handset off the hook to answer the call, a first recorder for reproducing the message of the called party for transmission over the telephone lines, a second recorder for receiving the message of the caller, and means for replacing the handset to terminate the call. This device requires two recorders and controls for answering the telephone as well as for terminating the call. In addition, the answering device must be carefully adjusted so that the handset is lifted a sufficient amount without completely dislodging it, and also for replacing the handset without interfering with the subsequent operation of the telephone.

The first type of device (a), must be directly connected to the telephone lines. This eliminates the necessity for a device to lift and replace the handset, but it must include mechanisms which respond to the ringing current of an incoming call and means for maintaining the line open for the entire call. In addition, past devices of this type have all required two phonographs or other recorders, one for the answering message, and the other to record the message of the caller.

It is an object of this invention to provide a new and improved telephone answering device.

It is another object of this invention to provide a new and improved automatic telephone answering device.

It is a further object of this invention to provide a new and improved automatic telephone answering device which requires only one recorder for both answering the call and for recording the message of the caller.

It is still another object of this invention to provide a new and improved automatic telephone answering device which is simple in construction but efficient in its operation and which requires little maintenance.

Other objects and advantages of this invention will become more apparent as the following description proceeds, which description should be considered together with the accompanying drawings in which.

Figure 1:
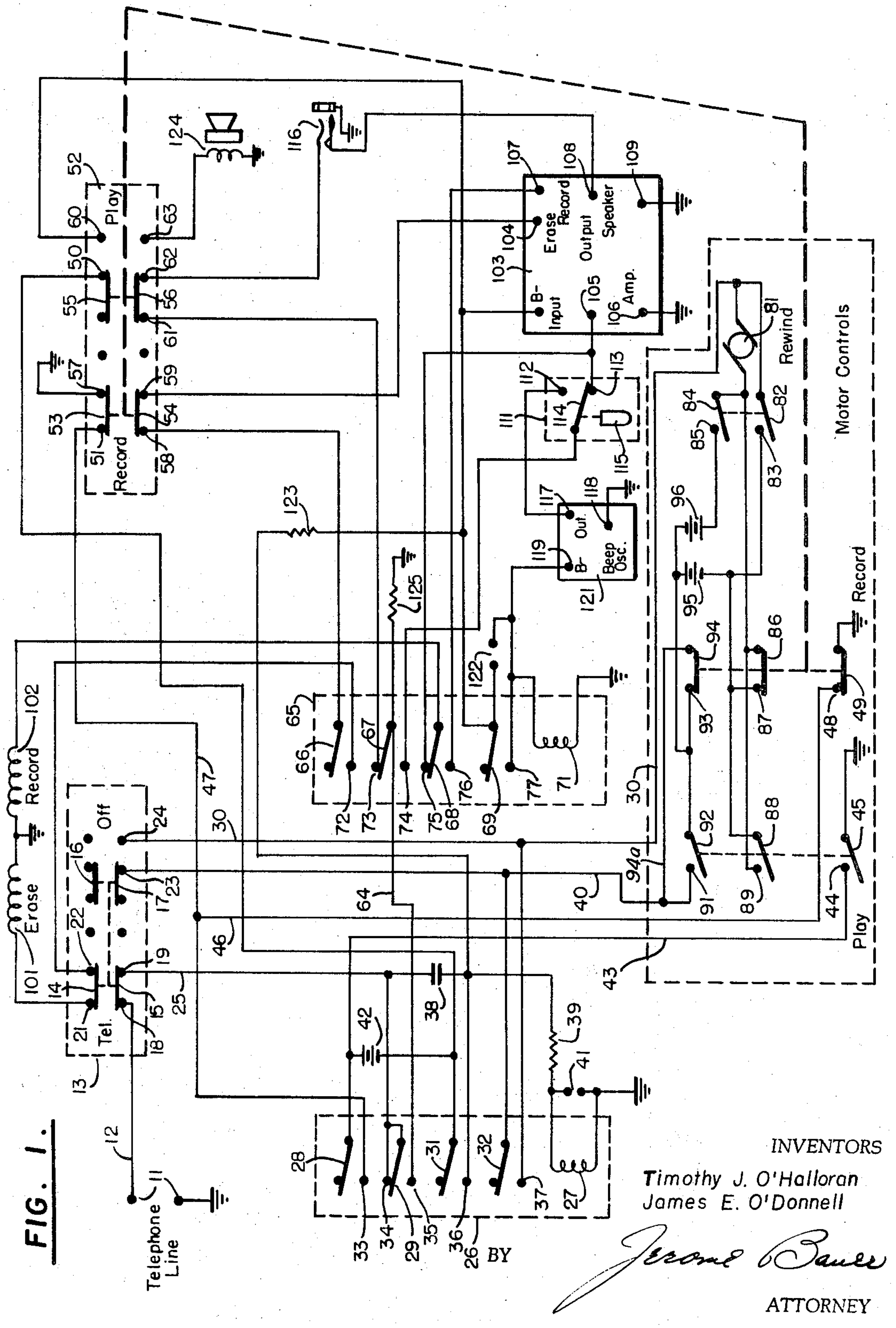
FIG. 1 is a schematic circuit diagram of the controls for the answering device of this invention.

Referring now to the drawings in detail, and more particularly to FIG. 1, the reference character 11 designates a pair of input terminals which are adapted to be connected directly to the telephone lines to be monitored. One of the input terminals 11 is grounded and the other is connected by a line 12 to a contact 18 of a slide switch 13. The slide switch 13 includes two pairs of conductive slides or movable contacts 14–15 and 16–17 which are ganged together. Each of the slides 14, 15, 16 and 17 bridges a pair of stationary contacts to form a 4-pole, double-throw switch. The switch 13 comprises 12 stationary contacts which include contacts 18, 19, 21, 22, 23 and 24. More specifically, the slides 14 and 15 bridge contacts 21, 22 and 18, 19 respectively, for one position of the switch 13 and the slide 17 is adapted to bridge contacts 23, 24 for the other position of the switch. In the position shown, the position for answering a call, the slide 15 connects the line 12 with another line 25, which is connected to the contact 19.

A relay 26 having a relay coil 27, movable contacts 28, 29, 31 and 32 and stationary contacts 33, 34, 35, 36 and 37 is shown in the unoperated condition. The line 25 is directly connected to stationary contact 34 and movable contact 29, and is connected through a capacitor 38 to stationary contact 36 and also through a resistor 39 to the ungrounded side of the relay coil 27. A normally open switch 41 is connected across the relay coil 27. The movable contact 31, which may connect with the stationary contact 36, is directly connected to one side of a battery 42, or other suitable source of direct current. The other side of the battery 42 is directly connected to the movable contact 28 which may connect with the stationary contact 33, and to a line 43 which terminates at a stationary contact 44 of a normally open switch having a movable contact 45 which is grounded. The stationary contact 33 of the relay 26 is connected to a line 46 which terminates at a stationary contact 48 of a normally closed switch having a grounded movable contact 49, and to a line 47 which terminates at a stationary contact 51 of a second slide switch 52. The slide switch 52 comprises two pads of conductive slides 53–54 and 55–56 and stationary contacts 50, 51, 57, 58, 59, 60, 61, 62 and 63. The slides 53 and 54 are adapted to bridge contacts 51, 57 and 58, 59 respectively, for one position of the switch 52 and the slide 56 is adapted to bridge contacts 61, 62 for the same position of the switch. On the other hand, the slide 56 bridges contacts 62, 63 for the other position of the double-throw switch 52. The stationary contact 35, which may be connected with the movable contact 29 of the relay 26 when the relay is energized, is connected by a line 64 directly to a movable contact 67 of a second relay 65 which includes movable contacts 66, 67, 68, and 69, stationary contacts 72, 73, 74, 75, 76 and 77 and an operating coil 71, one side of which is grounded. The stationary contact 37 of the relay 26 is connected directly to the stationary contact 24 of the slide switch 13. The movable contact 32 which may connect with the stationary contact 37 when the relay 26 is energized, is connected directly with stationary contact 23 of the slide switch 13. The two stationary contacts 23 and 24 may be bridged by the slide 17 when the switch 13 is in the OFF position. The stationary contact 24 of the slide switch 13 and the stationary contact 37 of the relay 26 are both directly connected to one side of the motor 81 which drives the magnetic tape recorder (not shown in detail).

In addition, the one side of the motor 81 is connected to the movable contact 82 of a normally open switch which includes a stationary contact 83. The stationary contact 83 is connected to the negative side of a battery 95 and to the stationary contact 87 of a normally closed switch which includes a movable contact 86. The contact 83 is also connected to the movable contact 88 of a normally open switch which includes a stationary contact 89. The other side of the motor 81 is connected to the movable contact 86, the stationary contact 89 and to a movable contact 84 of a normally open switch which includes a stationary contact 85. The contact 85 is connected to the positive side of a battery 96, the negative side of which is connected to the positive side of the battery 95; the stationary contact 93 of a normally closed switch which includes a movable contact 94; and to a movable contact 92 of a normally open switch which includes a stationary contact 91. The contacts 91 and 94 are connected together by a lead 94A and to the stationary terminal 23 of the slide switch 13. The lead 94A is connected to the movable contact 32 of the relay 26. The contacts and switches just mentioned, namely the stationary contacts 23 and 24 of the slide switch 13, the contacts 32 and 37 of the relay 26, and the switches which include the movable contacts 45, 49, 82, 84, 86, 88, 92 and 94, together with the batteries 95 and 96, can be considered together as motor controls for determining the speed and direction of the operation of the motor 81. The movable contacts 45–88–92 are ganged for operation together; the movable contacts 49–86–94 are ganged for operation together and with the slides of the slide switch 52; and the movable contacts 82–84 are ganged for operation together. These switches may be of any suitable push-button type; preferably with latches which hold the depressed switch in the depressed condition, but which may be released by the operation of another switch.

The stationary contact 21 of the slide switch 13 is connected to one end of an erase head 101, the other end of which is connected to ground and to one end of a record head 102. The other end of the record head 102 is connected to the movable contact 68 of the relay 65. The stationary contact 22 of the slide switch 13 is connected to the stationary contact 72 of the relay 65. The two slide switch contacts 21 and 22 are bridged by the conductive slide 14 in the TEL position shown in FIG. 1. The movable contact 66, which connects with the stationary contact 72 of the relay 65 when the relay is energized, is connected to the stationary contact 58 of the slide switch 52. The conductive slide 54 of the slide switch 52 bridges the stationary contacts 58 and 59 in the RECORD position as shown in FIG. 1. The contact 59 is directly connected to an ERASE terminal 104 of an amplifier 103. One input terminal 106 and one output terminal 109 of the amplifier 103 are grounded. The input terminal 105 is connected through the stationary contact 113 and a movable contact 114 of an intermittently operated beep switch 111 to the stationary contact 74 of the relay 65. The terminal 105 is also connected to contact 75 of the relay. The record output terminal 107 of the amplifier 103 is connected to the stationary contact 76 of the relay 65, and the speaker output terminal 108 is connected through an in-line telephone jack 116, which is used for monitoring purposes, to the stationary contact 62 of the slide switch 52. The terminal 112 of the beep switch 111 is connected to an output terminal 117 of an oscillator 121. Another terminal 118 of the oscillator 121 is grounded, and electrical energy is supplied to the oscillator 121 through a third terminal 119 and stationary contact 77 of the relay 65. A normally open switch generally designated 122 connects, when closed, terminal 119 to movable contact 69 of the relay 65 and, through a resistor 123, to the stationary contact 36 of the relay 26. The amplifier 103 is supplied with energy from the battery 42, through the resistor 123, when the relay 26 is operated.

In the slide switch 52, the contact 57 is grounded. In the position shown, slide 53 bridges the contacts 51 and 57. Contact 63 is connected to one side of a speaker 124, the other side of which is grounded. In the relay 65, the stationary contact 73 is connected to the contact 61 of the slide switch 52, and the movable contact 67 is connected to one side of a load resistor 125, the other side of which is grounded.

Figure 2:
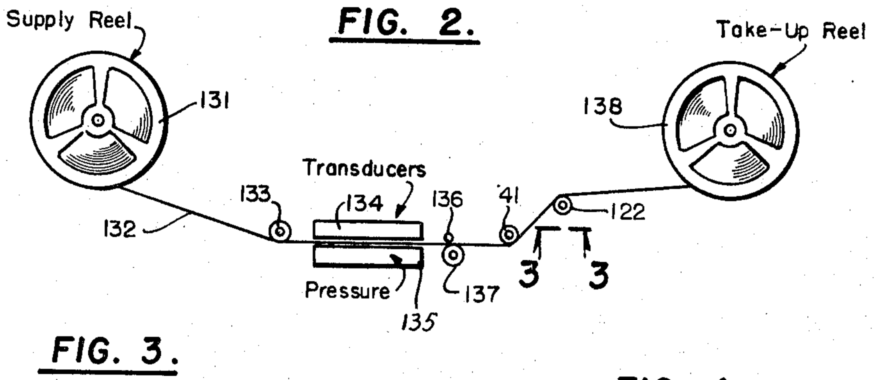
FIG. 2 is a schematic diagram of the magnetic tape path of the recorder used in the answering device of this invention.

The automatic telephone answering device of this invention uses a magnetic tape recorder of standard contemporary construction as the recording medium for both the answering message and the messages recorded by the callers. The tape path is illustrated in FIG. 2. A magnetic tape 132 of any suitable material such as synthetic resin film coated on one side with a magnetic oxide is stored on a supply reel 131 of a size to fit the recorder being used. At present, standard reel sizes are approximately 3″, 5″, and 7″ in diameter and hold approximately 300′, 600′ and 1200′, respectively, of tape 0.0015″ in thickness. The tape is usually ¼ inch in width. In a typical recorder, the tape 132 passes from the supply reel 131 over an idler wheel or post 133 and past the recording, playback and erasing heads all contained in FIG. 2 in the box 134 designated Transducers. Suitable pressure devices contained in a box 135 and designated Pressure hold the tape 132 against the transducers during operation of the equipment. An idler wheel 137 which is movable toward and away from a driving capstan 136 forces the tape against the capstan 136 to be driven thereby. In the recorder used in this invention, two cylindrical switches 41 and 122 are added to the tape path between the capstan 136 and the take-up reel 138. As noted above, the motor 81 is operable to advance or rewind the tape 132.

Figure 3:
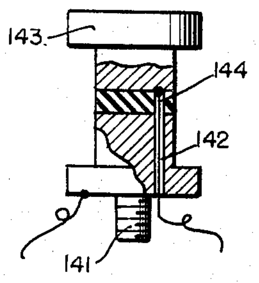
FIG. 3 is a sectional view taken along line III—III of the switch shown in FIG. 2.

The cylindrical switches 41 and 122, which have been diagrammatically shown in the circuit of FIG. 1, are identical and are shown in detail in the sectional view of FIG. 3. Each switch comprises a mounting screw 141 by which it is supported on the tape deck (not shown). Two conductive studs 142 and 143 separating by insulating means 144 are all mounted on the supporting screw 141. Portions of the conductive studs and the insulating means may be of smaller diameter than the end portions of the conductive studs as shown. The larger diameter rims serve to guide the tape in its movement.

In operation, the input terminals 11 are directly connected at any convenient point to the telephone line being monitored. When the device of this invention is to monitor incoming calls, the slide switches 13 and 52 are placed in the TEL and RECORD conditions, respectively, as shown in FIG. 1. Until a call is received, the relays 26 and 65 are in the unenergized condition as shown. The RECORD motor control switches 49, 86, and 94 are closed automatically when slide switch 52 is set at RECORD. All batteries shown may be other sources of direct current as desired, but all must be in operative condition.

When a call is received, the ringing current appearing at the input terminals 11 is applied to line 25 through the terminals 18 and 19 and the slide 15 of switch 13. The ringing current passes through the capacitor 38 and resistor 39 to energize the relay coil 27. Relay contacts 28, 29, 31 and 32 are then moved to their downward positions, as the relay is oriented in FIG. 1. Movable contact 31 connects one side of the battery 42 through the contact 36 to one side of the coil 27, and movable contact 28 connects the other side of the battery 42 through stationary contact 33 of the relay 26 and the line 47, the stationary contacts 51 and 57, and the slide 53 of the slide switch 52 to ground. Since the other side of the relay coil 27 is grounded, the battery 42 is connected across the relay coil 27 and serves to maintain the relay 26 in the operated condition after the ringing current has ceased. The capacitor 38 serves to block the direct current from the battery 42 from the telephone lines. At the same time, movable contact 29 of relay 26 connects the telephone lines through the slide switch 13 and the line 25 to a loading resistor 125 which serves to keep the telephone line open. The call is now answered and the line is open for conversation.

In addition, the motor 81 is connected to the positive terminal of the battery 95 via the circuit comprising lead 30, contacts 37, 32, lead 40 and switch contacts 93, 94; and to the negative terminal of the battery 95 via the switch contacts 86, 87. Accordingly, the motor 81 is energized to advance the tape 132.

Figure 4:
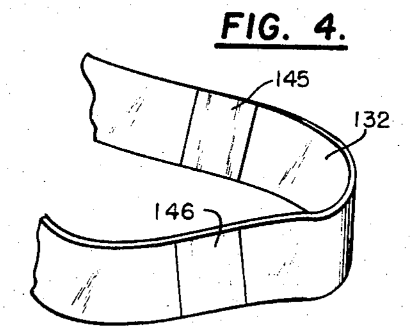
FIG. 4 is an elevational view of a portion of the magnetic tape showing the conductive control portions.

As shown in FIG. 4, the tape 132 has applied to it at spaced intervals, patches of conductive film, such as aluminum foil, on either side of the tape. The patch 145 is on one side of the tape 132 in FIG. 4 and the patch 146 is on the other side. Referring now to FIG. 2, the tape 132 is shown passing over both switches 41 and 122, but one side of the tape 132, the side with the oxide coating, contacts switch 41, whereas the other side of the tape 132 contacts the switch 122. As shown in FIG. 3, the two conductive portions 142 and 143 of each of the switches 41 and 122 are insulated from each other. However, when a patch 146 passes the switch 122, or when a patch 145 passes the switch 41, the patch establishes a conductive path between the respective conductive studs 142 and 143 to complete the circuit therebetween.

Figure 5:
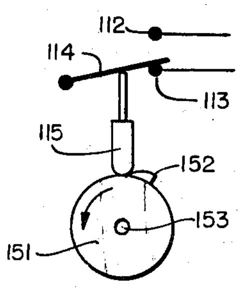
FIG. 5 is an elevational view of the cam and switch for providing a beep tone on the telephone line.
Figure 6:
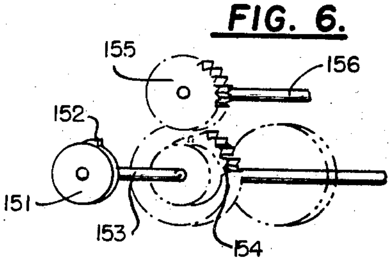
FIG. 6 is a perspective view of the drive means for the cam of FIG. 5.

An audio oscillator 121 is also included in the device of this invention to provide a beep tone which indicates to the caller when his statements are being recorded. The oscillator 121 is any standard audio oscillator which is energized from the battery 42 when both relays 26 and 65 are operated. The energization is applied through contacts 31–36, resistor 123, and contacts 69–77. The output from the oscillator 121 is taken from the output terminal 117 and is applied through the contacts 112 and 114 of the beep switch 111 to the contacts 67–74 of relay 65 and across the load resistor 125. Thus, whenever the oscillator 121 is energized, and the switch contacts 112–114 are closed, the output from the oscillator 121 is applied to the telephone lines. The operation of the switch 111 is better shown in FIGS. 5 and 6. The switch 111 includes two stationary contacts 112 and 113 and a movable contact 114. An operating member or cam follower 115 is mechanically connected to the movable contact 114. A circular cam 151 having a nose 152 is mounted on a rotating shaft 153. As the shaft 153 rotates, the nose 152 periodically forces the cam follower 115 away from the cam 151, causing contacts 114 and 112 to close. When the nose 152 has passed the cam follower 115, the natural resilience of the movable contact 114, or additional spring members if desired, cause the contact 114 to return to its rest position in contact with the contact 113. One possible manner in which the cam 151 can be driven is shown in FIG. 6. A wheel 154, or a gear if this is considered better, is mounted on the shaft 153 which is mounted in suitable bearings, not shown. A drive wheel 155, or gear, is mounted on a shaft 156 and is in contact with the wheel 154. The shaft 156 may be driven by the tape drive through any desired means; for example, the shaft 156 may be coupled to the capstan 136 or to the supply reel 131 and be driven therefrom. As the shaft 156 rotates, it drives the wheel 155 which bears against the wheel 154 and causes the cam 152 to rotate. If desired, the shaft 153 may be telescoping so that the wheels 154 and 155 can be disengaged to prevent the rotation of cam 152.

Immediately before each patch 146 on the tape 132, there is a section of tape 132 which bears a prerecorded message to the caller. This record may be produced in any suitable manner in advance and contains an instruction to call another number or an instruction indicating that the caller's message will be recorded to be acted upon later. A short length of tape 132 is then provided for the recording of the message of the caller. Before the patch 146 passes the switch 122, the relay 65 remains unoperated. In this condition of the relay 65, the condition shown in FIG. 1, the recording head 102 is connected through contacts 68 and 75 to the amplifier input terminal 105, and the output 108 of the amplifier 103 is connected through slide switch 52, the normally closed contacts of the monitoring jack 116 and contacts 67 and 73 of the relay 65 to the telephone line. The prerecorded message is then transmitted to the calling party. Immediately after the end of the prerecorded message, the patch 146 passes over the switch 122, closing that switch. This closes the circuit from the negative side of the battery 42, through the movable contact 31 and the stationary contact 36, the resistor 123, and the switch 122 to one side of the coil 71. The other side of the coil 71 is grounded, and as explained earlier, the other side of the battery 42 is also grounded. Thus, coil 71 is energized and the relay 65 operates. Closing of the contacts 69 and 77 of the relay 65 places the battery 42 across the coil 71 by shunting the switch 122 to maintain the relay 65 operating even after the conductive patch 146 passes and the switch 122 opens. The closing of the contacts 66 and 72 of the relay 65 connects the erase head 101 through the slide switch 13, and the slide switch 52 to the output terminal 104 of the amplifier 103 to energize the erase head and remove any previously recorded message from the portion of tape 132 passing the heads. Closing of the relay contacts 67 and 74 connects the telephone line through the slide switch 13, and the operated contacts 29 and 35 of the relay 26, in the manner noted above, to the amplifier input terminal 105 through the contacts 114 and 113 of the beep switch 111. Closing of the contacts 68 and 76 of the relay 65 connects the record coil 102 to the record output terminal 107 of the amplifier 103. This applies the output from the amplifier 103 to the record coil 102 to energize that coil.

At the same time, when the relay 65 operates, the closing of the contacts 69 and 77 applies electrical energy from the battery 42 to the beep oscillator 121 causing that oscillator to operate. The next time, and every fifteen seconds thereafter, that the nose 152 of the cam 151 comes around to the cam follower 115, the output of the oscillator 121 will be applied through the terminals 114 and 112 to the telephone line as a beep tone. The signal to begin talking is given at the end of the prerecorded message. The output from the oscillator 121 is not applied to the tape 132, but only to the telephone line. As the caller speaks, his message is conveyed from the telephone line across the load resistor 125, through contacts 67 and 74 of the delay 65, the contacts 114 and 113 of the switch 111 into the input terminal 105 of the amplifier 103, where it is amplified and then applied from the output terminal 107 of the amplifier 103 through contacts 68 and 76 to the recording head 102 to be recorded on the tape.

At the end of a prescribed time, a conductive patch 145 passes switch 41, closing that switch. This short-circuits the relay coil 27, permitting that relay to open. The opening of relay contacts 31 and 36 removes the battery 42 from the relay coil 71 also, permitting relay 65 to open. When relay 26 opens, the contacts 32 and 37 separate, deenergizing the motor 81. The equipment is then ready for another cycle of operation.

Summarizing the operation of the device thus far described, ringing current energizes the relay 26 which establishes a holding circuit about the coil 27. The operated contacts of the relay 26 terminate the telephone line with the impedance 125 and cause the motor 81 to operate to advance the tape 132. A pre-recorded message on the tape is sensed by the record head 102, now operating in the playback mode, and is applied, through the amplifier 103, switch 52 and relay contacts 73, 67 of deenergized relay 65, to the telephone line.

Thereafter, patch 146 bridges the contacts 122 to energize the relay 65. This action connects the record head 102 in the record mode to record a message on the tape. After a sufficient length of tape has been advanced, the patch 145 bridges the switch 41 to short the coil 27 which deenergizes the system.

It must be borne in mind that between each patch 145 and the following patch 146, there is a prerecorded message of the called party with instructions for anyone who calls. Then, between each patch 146 and the following patch 145, there is space provided for the recording of a message by the calling party. A small reel of tape can be used for many calls. If we assume that 15 seconds are provided for each of the pre-recorded messages and 30 seconds are provided for each caller message, then one cycle of operation will use 45 seconds of tape. With normal tape speeds in the neighborhood of 3½ inches per second, 45 seconds of tape will require 157.5 inches or about 13 feet of tape. Thus, a 3" reel of 1½ mil tape is suitable for 23 cycles of operation. If a tape speed of 1⅞ inches per second is used, twice as many cycles are possible for the same length of tape, and if tape only 1 mil in thickness is used, 50% more tape may be stored on a 3" reel. Thus, with a small recorder using 3" tape reels, about 70 incoming calls can be handled.

When it is desired to play back the incoming calls, the slide switch 13 is placed in the OFF position. This disconnects the telephone line from the equipment by moving the slide 15, it removes the erase circuit from operation by moving the slide 14, and it connects together lines 30 and 40 of the motor control circuit by bridging contacts 23 and 24 with the slide 17. The slide switch 52 is placed in the PLAY position which automatically opens the motor control switches 49, 86 and 94. In addition, the erase circuit is removed from the amplifier 103 by moving the slide 54 away from the contact 58, and it establishes a circuit through the speaker 124 by bridging contacts 62 and 63 with the slide 56. The slide 55 bridges the contacts 50 and 60 feeding B− to the amplifier 103. The tape 132 is rewound by closing ganged switches 82 and 84 by hand, connecting the battery 96 in series with the battery 95 and across the motor 81. The two batteries in series drive the motor 81 at a higher rate of speed, and the reversed polarity of the two batteries causes the motor 81 to run backwards. When the tape 132 is rewound, the switches 45, 88 and 92 are closed by hand, and the switches 82 and 84 are opened. This connects the positive side of battery 95 through contacts 92, 91 and lines 30 and 40 to one side of the motor 81, and the negative side of battery 95 through switch 88 to the other side of the motor 81 and energizes the motor to drive the tape 132 forward. Since the relays 26 and 65 are open, the conductive patches 145 and 146 have no effect on the operation as they pass the switches 41 and 122.

As the tape 132 passes the record head, the magnetic flux recorded thereon by previous recordings induce potentials in the record head 102. These potentials are applied through contacts 68 and 75 of the relay 65 to the input terminal 105 of the amplifier 103. The potentials are amplified in the amplifier 103 and are applied through the output terminal 108 and the monitoring jack 116 to contacts 62 and 63 and the speaker 124. When all of the messages have been heard, the tape 132 is again rewound, and the equipment is ready for further operation.

It should be noted that during playback of the tape 132, erasure of the messages is impossible due to the fact that the erase head 101 is isolated from the equipment. One side of the erase head is open at contact 21 of the slide switch 13 and the erase output of the amplifier 103 is open at contact 54 of the slide switch 52. Thus, the inadvertent erasure of a desired message is prevented. In fact, the only time the erasing head 101 is energized is during the actual recording of the incoming message.

In addition, this equipment uses only one tape for both reproduction of the prerecorded message by the called party and for the recording of the caller's message. This simplifies the equipment required and reduce maintenance and initial costs.

The device of this invention uses a magnetic tape recorder of standard contemporary construction which is modified in accordance with the teachings contained above. Since specially built equipment is not necessary to carry out this invention, the initial costs and those of maintenance are reduced.

Figure 7:
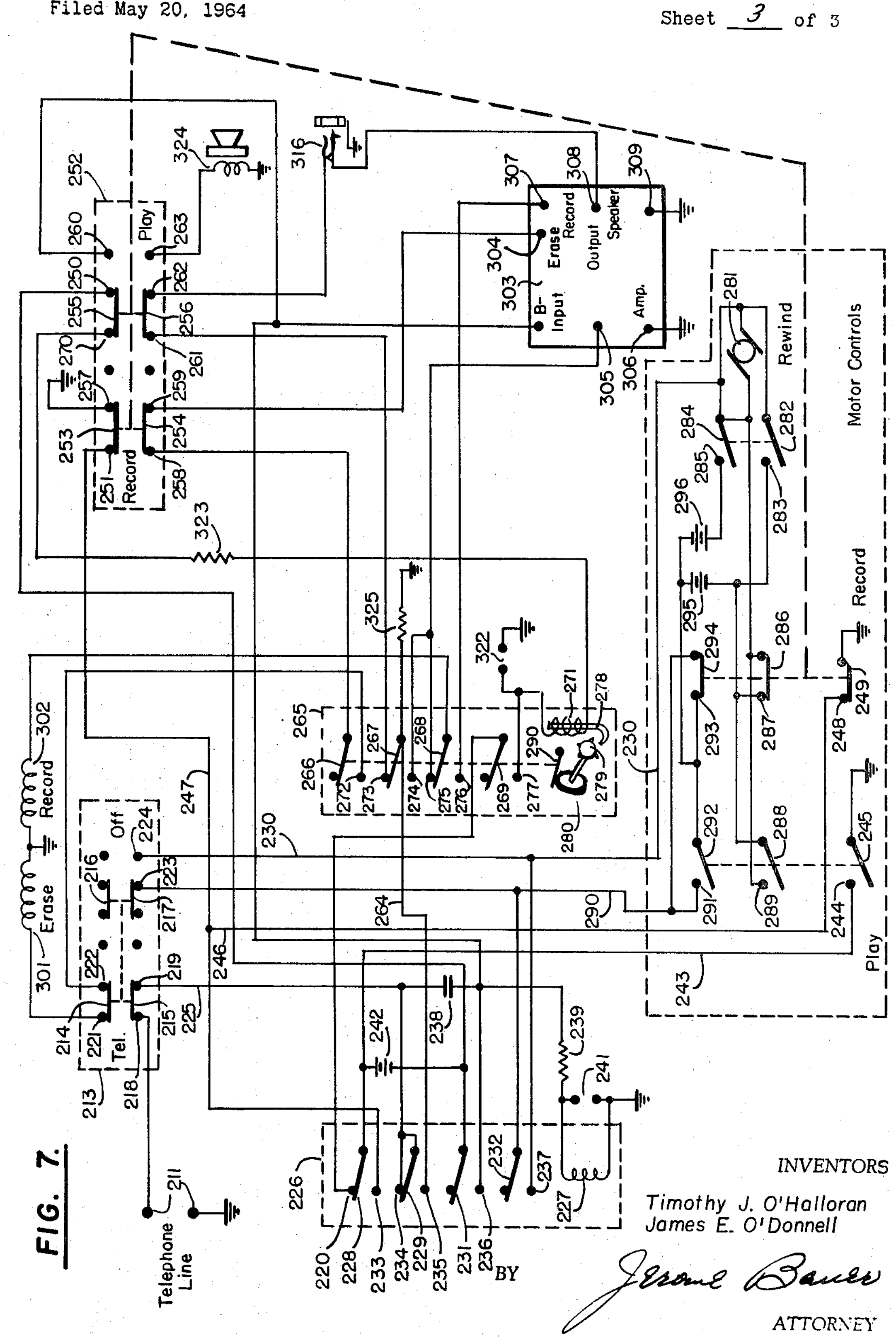
FIG. 7 is a schematic circuit diagram of a modified control for the recorder of this invention.

FIG. 7 illustrates a modification of the automatic telephone answering device of FIG. 1, which modification eliminates the beep oscillator 121 and the beep switch 111. The modification of FIG. 7 comprises two slide switches 213 and 252 of the same general construction as the slide switches 13 and 52 of FIG. 1, and a relay 226 similar to the relay 26 of FIG. 1. A second relay 265, however, is a two-position stepping or cycling relay which is pulsed from one of its two positions to the other by sequential input pulses.

The telephone line being monitored has one side grounded at the input terminals 211. The ungrounded side is connected through a pair of stationary contacts 218 and 219 and the bridging slide 215 to a line 225. The line 225 is directly connected to the movable contact 229 and stationary contact 234 of the relay 226, and through capacitor 238 to stationary contact 236 and through resistor 239 to one side of the relay coil 227, the other side of which is grounded. The coil 227 is shunted by a normally open switch 241 of the type shown in FIG. 3. A source of direct current such as battery 242 has one side connected through stationary contacts 250 and 270 and the bridging slide 255 of the slide switch 252 and through resistor 323 to one side of the operation coil 271 of the relay 265. The other side of the coil 271 is connected to the stationary contact 277 of relay 265 and to one side of the normally open switch 322, which is of the type shown in FIG. 3, the other side of which is grounded. The one side of the battery 242 is also connected to the movable contact 231 of the relay 226 which connects with the stationary contact 236, when the relay is operated, to connect the battery 242 to one side of the coil 227 to latch that coil in the operated condition; to the B-input terminal of the amplifier 202; and to stationary contact 260 of the slide switch 252. The other side of the battery 242 is connected to the movable contact 228, which is connected with the stationary contact 220 in the unoperated condition of the relay 226, and therethrough with the movable contact 269 of the relay 265. In the operated condition of the relay 226, the movable contact 228 connects with the stationary contact 233 to connect the other side of the battery 242 through stationary contacts 251 and 257 and the bridging slide 253 to ground, and through a stationary contact 248 and a movable contact 249 of a motor control switch to ground. In addition, in the operated condition of the relay 226, the movable contact 229 connects with the stationary contact 235 to connect the telephone line to a movable contact 267 of the relay 265 and through a resistor 325 to ground to provide a load for the telephone line.

Thus, when the relay 226 is operated, the telephone line is grounded through the loading resistor 325 keeping the line open, the battery 242 is effectively connected across the operating coil 227 to latch the relay 226 in its operated condition, energy is provided for the amplifier 303, and through the movable contact 232 and the stationary contact 237, the motor 81 is energized from a battery 295 through a switch comprising a stationary contact 293 and a movable contact 294, a switch comprising a stationary contact 287 and a movable contact 286, line 230, contacts 237 and 232 and line 240.

When a call comes in on the telephone line, the ringing current passes through the input terminals 211, the contacts 218 and 219 and the slide 215, line 225, capacitor 238 and resistor 239 to energize the coil 227 and operate the relay 226. Once the relay 226 operates, the contacts 231 and 236 close, connecting the battery 242 across the coil 227 and latching the relay 226 in the operated condition. As mentioned earlier, the motor 281 is energized and starts the tape moving. A prerecorded message on the tape is then reproduced and applied to the telephone line for the caller.

As the tape moves past the record-play head as shown in FIG. 2, the magnetic recordings on the tape induce potentials in the record coil 302. The coil 302 is connected from ground through movable contact 268 and stationary contact 275 of the relay 265 in its first condition, that shown in FIG. 7, to the input terminal 305 of the amplifier 303. The reproduced signals are amplified therein and are applied from the output terminal 308 of the amplifier 303, through the monitoring jack 316 to the contacts 262 and 261 and the slide 256 of the slide switch 252, the contacts 273 and 267 across the load resistor 235, and to the telephone line.

So far, in the operation of the system of FIG. 7, the ringing current of an incoming call has operated relay 226 to energize the motor 281 and so start the tape moving past the reproducing head to reproduce the prerecorded message therefrom from the caller, the call has been answered by connecting the load resistor 325 across the line, and the amplifier 303 has been energized, all resulting in the caller hearing a message which had earlier been recorded. To signal to the caller when he should begin to speak so as to record his message, and to also conform to the legal requirements which specify a periodic audio tone on the telephone line to indicate to the calling party that his call is being recorded, it is necessary to generate an audio tone at the end of the prerecorded message and apply that tone to the telephone line. The system of FIG. 1 used the oscillator 121 for this purpose. The system of FIG. 7 has eliminated the oscillator 121.

Figure 8:
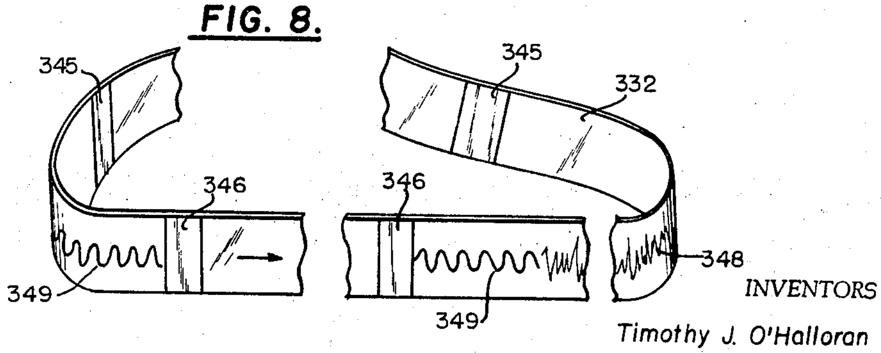
FIG. 8 is an elevational view of a portion of a modified tape for use in the system of FIG. 7.

To supply the desired audio tone, the tape 332, see FIG. 8, is first processed by recording thereon from one end to the other a suitable audio tone, say 1000 cycles per second. When the prerecorded message is now recorded on the specified locations on the tape 332, the tone at those locations will be automatically erased. This has been specified throughout this description. Erasure of an earlier recorded message is accomplished upon subsequent recording only when and at those locations where the new recording is made. Consider the tape 332 shown in FIG. 8. The prerecorded message is symbolically shown at 348, followed by a very short interval of silence and then by the tone at 349. It must be understood that the designations shown in FIG. 8 are merely symbolic representations to indicate the relative positions of the prerecorded messages and tones. Such representations are not an attempt to actually portray a likness of the sound signals. A conductive strip or portion 346 is attached to the face of the tape 332 at the end of the tone 349. When the conductive strip 346 passes the switch 322, it effectively closes the switch 322, completing the circuit from the negative side of battery 242 through the slide switch 252, the resistor 323 and the operating coil 271 of the relay 265 to ground. This applies a pulse to the coil 271 and causes it to pull up the pawl 278, causing the ratchet 279 to rotate through about 90°. The ratchet 279 is directly connected to an elongated cam 280 and drives that cam. As the cam 280 rotates, it alternately forces up a cam follower 290 and then permits it to return to a downward position. The cam follower 290 is connected with the movable contacts 266, 267, 268 and 269 of the relay 265. Thus, with alternate pulses applied to the coil 271, the relay 265 is placed first in one condition of operation and then in its other condition of operation. In the one condition shown in FIG. 7, the relay 265 connects the system to play back a prerecorded message onto the telephone line. When the pulse from the battery 242 is applied to the coil 271 by the passage of a conductive portion 346 by the switch 322, the relay 265 is placed in its other operative condition with all of the movable contacts 266–269 in their lower positions. In this other operative condition of the relay 265, the erase coil 301, which has one end grounded, has its other end connected through the stationary contacts 221 and 222 of the slide switch 213 to the stationary contact 272 and the movable contact 266 of the relay 265, through the contacts 258 and 259 of the slide switch 252 and to the output terminal 304 of the amplifier 303 to become energized. At the same time, the record coil 302, which also has one end grounded, has its other end connected through the movable contact 268 and the stationary contact 276 of the relay 265 to the output terminal 307 of the amplifier 303. The input terminal 305 of the amplifier 303 is connected through the stationary contact 274 and the movable contact 267 of the relay 265 to the telephone line which, as noted above, is connected across the load resistor 325. Thus, the recorder is placed in condition to record anything coming in over the telephone line. Since the erase coil 301 is now in operation, anything which was originally recorded on the section of tape now passing the recording and erase coils 301 and 302 is erased. This would include the tone which had been originally recorded on this portion of the tape also. At the end of the allotted time for the caller to record his message, another conductive strip 346 passes the switch 322 and causes another pulse from the battery 242 to be applied to the coil 271. The cam 280 rotates through about 90° again, and the cam follower 290 together with all of the movable contacts 266–269 are forced upward into the operative condition shown. This again places the recorder in condition to transmit to the telephone line anything recorded on the tape 332. For the next short section of tape 332 the tone originally recorded there is again transmitted over the telephone lines. This signals to the caller that his recording time is up. At the end of the tone, a conductive strip 345 passes the switch 241, shorting the coil 227 of the relay 226 and causing the relay 226 to open. This effectively opens the circuit from the battery 295 to the motor 281 causing that motor to come to a halt and to stop the moving tape. It also disconnects the load resistor 325 from the telephone line by opening the connection through the contacts 235 and 229 terminating the connection, and it breaks the latching circuit connection through the contact 231 and 236 for the coil 227. In addition, the movable contact 228 connects with the stationary contact 220 of the relay 226 connecting the positive side of the battery 242 with the contact 269 of the relay 265. Should, through some action, the relay 265 be in the other operative condition, the contact 269 would be connected with the contact 277, and a pulse would be applied to the coil 271 ensuring that the relay 265 is placed in the operative condition shown. The system is now ready for another cycle of operation.

When desirable or necessary in order to conform to government regulations requiring that the caller be informed that his message is being recorded, additional tones or beep tones 349 may be added in the stretch of tape that is made available for recording the incoming message. This may be accomplished by adding to the tape 332 a set of two additional conductive portions 346 on that portion of the tape which records the incoming message. During the time that the incoming message is being recorded, as the first one of the set of strips 346 passes the switch 322, the relay 265 is caused to switch the circuit into position for playing back or sending to the caller messages prerecorded on the tape. At that time, the prerecorded tone signal 349 will pass the recording head and will be sent or transmitted to the caller in the form of a beep tone. Then, the second of the set of two strips 346 passes the switch 322 to cause the relay 265 to switch the circuit back to the recording position to continue recording the incoming message. Thus, during the recording of the incoming message, there is a brief interruption during which the first strip 346 causes a switching of the circuit from its record position to its play back position. This permits the play back to the caller of the beep tone 349. Shortly thereafter, the second one of the set of strips 346 again causes the circuit to switch back to the continued recording of the incoming message. Obviously, there may be as many of these sets of switching strips 346 as is necessary to provide beep tones 349. The spacing between such sets of strips controlling the length of the beep tone 349 played back to the caller may also be controlled.

The operation of the system for reproducing the messages recorded is the same as that described above in connection with the description of FIG. 1 and it will not now be repeated. It is to be understood that when the telephone line is described as being connected to the terminals 11 of FIG. 1 or 211 of FIG. 7, the appropriate terminals are actually connected in parallel with the telephone instrument. Thus, even though the automatic answering system of this invention is operative, it does not disturb the normal operation of the telephone instrument.

The monitoring jack 316 may be used for monitoring calls and for testing the operation of the apparatus. A set of earphones of low impedance may be connected into the circuit by means of the jack 316, and the operation of the system may be monitored aurally.

The tape portions for recording incoming messages are readily identified both visually and electrically by the presence of conductive patches on the tape. Since the apparatus of this invention uses conductive patches on both sides of the tape, one for one function and the other for another function, at any time the next operation can be readily determined by observation. This simplifies testing and repairing of the equipment.

Thus, the above specification has described a new and improved automatic telephone answering device which is simple in construction and operation, uses standard components which are readily available for a low first cost, and is rugged and efficient so as to provide long life and low maintenance costs. It is realized that the above description may indicate to others additional ways in which the principles expressed above may be used without departing from the spirit of this invention. It is, therefore, intended that this invention be limited only by the scope of the appended claims.

What is claimed is:

1. An automatic telephone answering device which comprises a recording means having an elongated record medium and a motor for driving said record medium, means connected to a telephone line and responsive to the ringing current of an incoming telephone call to initiate operation of said recording means to answer the call by reproducing a prerecorded message from said record medium and applying said message to said telephone line, first means responsive to the passage of a first portion of said record medium immediately following a prerecorded message to condition said recording means for the recording of an incoming message on said record medium from said telephone line, and second means responsive to the passage of a second portion of said record medium spaced from said first portion for terminating the operation of the recording means and the telephone call, said means connected to a telephone line and responsive to the ringing current of an incoming call comprises a first electromagnetic relay having a first operating coil, a first plurality of pairs of stationary contacts and a first movable contact for each of said first pairs of stationary contacts, means for connecting said first operating coil to said telephone line, and means for connecting at least some of said first stationary and first movable contacts to said motor and to a source of electrical energy to energize said motor when a call is received on said telephone line and said first operating coil is energized thereby, said first relay including first holding means, and means for connecting said second means responsive to the passage of a second portion of the record medium to said first holding means to cause said first holding means to open and release said first relay when said responsive means is operated.

2. The telephone anwering device defined in claim 1 further including a second electromagnetic relay comprising a second operating coil, second pairs of stationary contacts and a second movable contact for each of said second pairs of stationary contacts, means for connecting said first means responsive to a first portion of said record medium between said second operating coil and a source of electrical energy so that the passage of said first portion of record medium by said first means closes the circuit to energize said second operating coil, said second relay including a second holding means to retain said second operating coil energized after said portion of record medium passes, the operation of at least some of said movable contacts connecting said recording means to said telephone line for recording an incoming message, and means in said recording means and connected through said second relay for erasing from said record medium any earlier recorded message on the same section of said record medium as an incoming message is being recorded.

3. The telephone answering device defined in claim 2 further including a signal generator for generating a start and stop signal, and means operated by said motor for periodically connecting the output of said signal generating means to said telephone line to provide operating signals for the caller.

4. A telephone answering apparatus for automatically responding to incoming telephone calls, said apparatus comprising a first switch means having contacts for connection to a telephone line and having a first and a second position of operation for connecting said telephone line to said apparatus in said first position and for disconnecting said apparatus from said telephone line in said second position, a first relay having an operating coil and a first plurality of pairs of stationary contacts, said first relay also including a first movable contact for each pair of first stationary contacts, said first relay having a first and second condition of operation for setting said apparatus into operation to answer an incoming telephone call in said first condition and for terminating said telephone call in said second condition, a second relay having second pairs of stationary contacts and a second movable contact for each pair of second stationary contacts, said second relay having a first condition of operation and a second condition of operation for causing said apparatus to play back prerecorded messages over said telephone lines in said first condition of operation and for causing said apparatus to record messages coming in over said telephone lines in said second condition of operation, a second switch means having a first and a second operative position, said second switch means in its first operative position placing said apparatus in a condition to respond to the condition of said second relay when said first switch is in its first position and in its second operative position for placing said apparatus in condition to reproduce telephone messages recorded from said telephone line, and means interconnecting the related contacts of said first and second switch means and said first and second relays.

5. The telephone answering apparatus defined in claim 4 further including a recorder comprising an elongated magnetic record medium; means for recording magnetic signals on said record medium and for reproducing magnetic signals previously recorded thereon; means for erasing magnetic signals from said record medium; means for driving said record medium past said recording and erasing means; and amplifier means to receive electrical signals to be recorded as magnetic signals and to transmit said signals to said recording means, to receive electrical signals from said reproducing means for amplification and transmission to said telephone line, and for energizing said erasing means.

6. The apparatus defined in claim 5 wherein said amplifier means comprises a signal input, an erase output and a signal output, and wherein said signal input is connected through said second relay in its second condition of operation to said telephone line to receive signals therefrom, and wherein said erase output is connected through said second relay in its second condition of operation to said erase means, and wherein said signal output is connected through said second relay in its second condition of operation to said record means to record on said record medium signals applied to said signal input.

7. The apparatus defined in claim 6 wherein said signal input is connected through said second relay in its first condition of operation to said record and reproducing means to receive signals reproduced from said record medium, said erase output is disconnected through said second relay in its first condition of operation from said erase means, and said signal output is connected through said second swtich in its first position of operation and through said second relay in its first condition of operation to said telephone line to apply thereto any signal applied to said signal input.

8. The apparatus defined in claim 7 further including a load resistor, and wherein said telephone line is connected through said first relay in its second condition of operation to said load resistor to maintain said line open, and further including a first source of direct current, said first source being connected through said first relay in its second condition of operation to said operating coil to maintain said coil energized, and through said first relay in its second condition of operation to said amplifier to maintain said amplifier energized, and direct current decoupling means for connecting said operating coil to said telephone line to respond to alternating currents originating thereon, whereby said first relay is operated by the ringing current of an incoming call to place said first relay into its second operating condition.

9. The apparatus defined in claim 7 wherein said second relay comprises a two position stepping relay which alternates from its first to its second position of operation with successive energizations, a second relay operating coil, a source of direct current, a normally open switch connected between said operating coil and said source of direct current, and control means attached to said elongated record medium for temporarily closing said normally open switch.

10. The apparatus defined in claim 9 wherein said record medium has prerecorded thereon a signal tone which is applied to said telephone line to warn said caller that the call is being recorded and to serve as a signal to define the limits of the caller's recording time, said apparatus further including a plurality of said control means attached to said record medium, said control means temporarily closing said normally open switch to cause said second relay to change from its first condition of operation at the end of said tone signal to its second condition of operation to place said apparatus in condition to record an incoming message, and to cause said second relay to change from its second condition of operation to its first condition of operation at the end of the recording time to permit a second tone signal to be transmitted on said telephone line.

References Cited

UNITED STATES PATENTS

| | | | |
|---|---|---|---|
| 2,549,548 | 4/1951 | Von Zimmermann | 179—6 |
| 2,848,541 | 8/1958 | Zimmermann | 179—6 |
| 2,928,898 | 3/1960 | Salzberg et al. | 179—6 |
| 3,127,474 | 3/1964 | Waldman | 179—6 |
| 3,337,690 | 8/1967 | Martin | 179—6 |
| 3,248,482 | 4/1966 | Kamborian | 179—6 |

BERNARD KONICK, *Primary Examiner.*

R. F. CARDILLO, *Assistant Examiner.*